United States Patent [19]
Knickel et al.

[11] 4,036,748
[45] July 19, 1977

[54] ASYMMETRIC, SEMIPERMEABLE MEMBRANES OF POLYBENZ-1,3-OXAZINE DIONES-(2,4)

[75] Inventors: Birger Knickel, Meerbusch-Lang; Rudolf Binsack, Krefeld; Hans Rudolph, Krefeld; Hans Jurgen Rosenkranz, Krefeld; Ludwig Bottenbruch, Krefeld, all of Germany

[73] Assignee: Bayer Aktiengesellschaft, Germany

[21] Appl. No.: 568,605

[22] Filed: Apr. 16, 1975

[30] Foreign Application Priority Data

Apr. 19, 1974 Germany .............................. 2418996

[51] Int. Cl.[2] .............................................. B01D 13/00

[52] U.S. Cl. .............................. 210/23 H; 210/500 M

[58] Field of Search .............. 210/500 M, 234, 433 M; 260/77.5 R

[56] References Cited

U.S. PATENT DOCUMENTS

| | | | |
|---|---|---|---|
| 3,526,588 | 9/1970 | Michaels et al. | 210/500 M X |
| 3,553,304 | 1/1971 | Reese et al. | 260/77.5 R |
| 3,686,116 | 8/1972 | Rio | 210/500 M X |

*Primary Examiner*—Frank A. Spear, Jr.
*Attorney, Agent, or Firm*—Connolly and Hutz

[57] ABSTRACT

An asymmetric semipermeable membrane of a homo- or co-polybenz-1,3-oxazine dione-(2,4).

6 Claims, No Drawings

ASYMMETRIC, SEMIPERMEABLE MEMBRANES OF POLYBENZ-1,3-OXAZINE DIONES-(2,4)

Asymmetric, semipermeable membranes of cellulose esters and polyamides have been successfully used for the desalination of sea water, for separating mixtures of substances and for concentrating fruit juices and whey according to the principle of reverse osmosis.

The membranes are produced by known methods of dissolving the polymers in solvent mixtures of different volatilities with the addition of swelling agents and pore forming substances and extruding or spraying the solutions. The membranes, while still moist, are made asymmetric by partial evaporation of the more volatile solvent followed by coagulation in a precipitation bath. In this way, the finished membrane has a relatively thin, active separating layer on the surface directly exposed to the precipitation bath, and, underneath this layer, a porous supporting structure. Both flat membranes and hollow fibres which have also good desalination and separating properties for mixtures of substances when under the pressure of reverse osmosis are produced by this method.

The asymmetric membranes hitherto used industrially for the desalination of sea water by reverse osmosis were almost exclusively made of cellulose esters and polyamides. In single stage desalination plants, they have throughflow rates of 10 to 1000 $l/m_2 d$ (of = day) of desalinated water with a salt retention capacity of 90 to 99.9% at an operating pressure of 40 to 120 atmospheres. The production of such highly efficient asymmetric cellulose acetate membranes for the desalination of sea water has been described in U.S. Pat. No. 3,133,132. Asymmetric polyamide membranes with excellent separating properties have been described in German Offenlegungsschrift No. 1,941,932 = British patent specification No. 1,259,170. However the membranes have little resistance to hydrolysis under certain conditions, for example cellulose ester membranes in the acid and alkaline range and polyamide membranes in the acid range at pH values below 4.

In addition, cellulose ester membranes are generally sensitive to high pressures and high temperatures in the sense that their membrane properties are deleteriously and irreversibly altered.

The known membranes are therefore hardly suitable for desalinating warm and acid waste waters.

It has now surprisingly been found that asymmetric membranes of polybenz-1,3-oxazine diones-(2,4) not only have excellent properties for desalinating sea water, brackish water and effluent water and for concentrating and separating mixtures of substances but they also have high thermostability insensitivity to pressure and resistance to hydrolysis in the acid and alkaline range and particularly in a strongly acid medium at pH values of 0 to 4.

This invention therefore relates to asymmetric semipermeable membranes of homo- or copolybenz-1,3-oxazine diones-(2,4) which are suitable for the desalination of sea water and for separating and concentrating mixtures of substances in an alkaline or acid medium, particularly in a strongly acid medium.

The preparation of polybenz-1,3-oxazine diones-(2,4) has been described inter alia in German Pat. No. 1,495,938 = British patent specification No. 1,019,847 and in German Offenlegungsschriften Nos. 1,595,579 and 1,720,774 = British patent specifications Nos. 1,173,608 and 1,203,401. According to these processes, di-o-hydroxyaryl-dicarboxylic acid esters are reacted with diisocyanates in solvents. German Offenlegungsschrift No. 2,232,467 discloses a variation of the process, according to which N,N'-aryl-substituted bis-carbamic acid esters are reacted with di-o-hydroxyaryldicarboxylic acid esters.

Suitable polybenz-1,3-oxazine dions-(2,4) are compounds with recurrent structural units of the general formula (I)

(I)

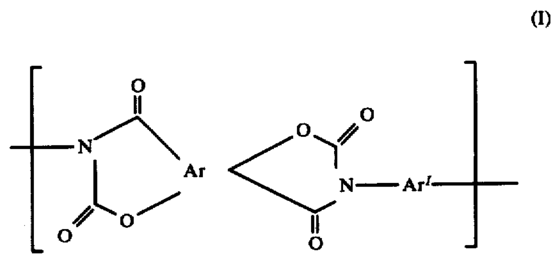

in which Ar represents a tetravalent aromatic group with 6 to 12 carbon atoms, preferably a group of the formula

II or

III

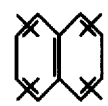

or a group of the formula IV

IV

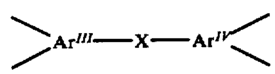

in which $Ar^{III}$ and $Ar^{IV}$ each represent an aromatic group with 6–12 carbon atoms and X represents a bond or a bridge member of the formula —O—, —S—, $—SO_2—$, $—CH_2$, $$-\underset{|}{\overset{CH_3}{}}\!\!CH-$$

or —CO— and the two bonds which bind the oxygen function and carbonyl function are in the ortho-position to each other, $Ar^1$ represents an aromatic phenylene or naphthylene group or a group of the formula V

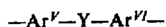 V in which $Ar^V$ and $Ar^{VI}$ which may be the same or different represent aromatic groups with 6 to 12 carbon atoms and Y represents a bridge member of the formula —O—, —S—, —SO—,

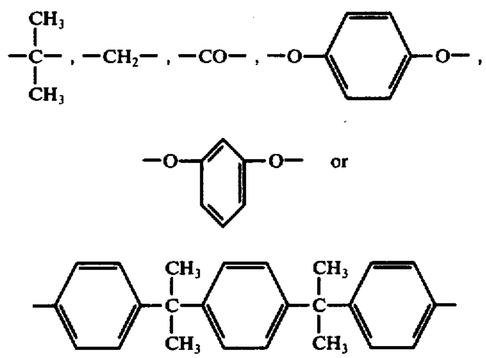

and have a polymerisation degree, $n$, of 10 to 200, preferably 30 to 100.

The solvents used for preparing the polybenzoxazine dione membranes according to the invention are preferably aprotic, highly polar, hydrophilic solvents such as N,N-dimethylformamide, N,N-dimethylacetamide, N,N,N',N'-tetramethylurea, N,N,N',N',N",N"-hexamethylphosphoric acid triamide, tetramethylenesulphone, dioxane, tetrahydrofuran, diphenylsulphoxide or dimethylsulphoxide. These aprotic, highly polar hydrophilic solvents may be used either alone or as mixtures with each other or with other less polar solvents, e.g. benzene, toluene, chlorobenzene, methylene chloride or carbon tetrachloride.

The solutions for preparing the membranes according to the invention contain 5 to 80 parts by weight, preferably 5 to 30 parts by weight of polybenz-1,3-oxazine dione-(2,4) and 95 to 20 parts by weight, preferably 95 to 70 parts by weight of solvent. To obtain the highly efficient semipermeable membrane properties, these solutions in addition contain pore-forming substances in a quantity corresponding to 0.1 to 40 parts by weight, preferably 5 to 30 parts by weight for every 99.9 to 60 parts by weight, preferably 95 to 70 parts by weight of polybenz-1,3-oxazine dione-(2,4).

Suitable pore forming substances include alkali metal, alkaline earth metal or onium salts, e.g. lithium salts such as lithium chloride and lithium nitrate, calcium salts such as calcium chloride, sodium salts such as sodium chloride and sodium sulphate, ammonium salts such as ammonium chloride and ammonium sulphate, pyridinium salts such as pyridinium chloride and pyridinium sulphate or mixtures of such salts.

The preferred pore forming substances used are lithium chloride and lithium nitrate.

The membranes according to the invention may be produced continuously or discontinuously, for example in the form of flat membranes. To produce these membranes, the solutions are cast to form films, e.g. in thickness of 50 $\mu$ to 1 mm, preferably 100 $\mu$ to 500 $\mu$, either continuously on drum or band casting machines or discontinuously using a film carriage on a substrate which is inert to the solvent, e.g. a glass, metal, ceramics or plastics substrate. The solvent is then partially removed in a stream of air or nitrogen or under reduced pressure for from 30 seconds to 2 hours, preferably 30 seconds to 60 minutes, at temperatures of 20° to 200° C, preferably 30° to 150° C.

The membranes according to the invention can also be produced from solution in the form of hollow fibres. Such hollow fibres can be produced, for example, by means of a spinnerette described in Belgian Pat. No. 704,360. In that case, the solution of polybenzoxazine diones is forced through the dies of the spinnerette at temperatures e.g. between 80° and 200° C, preferably between 100 to 150° C to form hollow fibres. These fibres are then dried, for example for 30 seconds, to 60 minutes, preferably 5 to 30 minutes, in a stream of nitrogen at 20 to 200° C, preferably 30° to 150° C.

The necessary heat of evaporation for producing the membranes can be transmitted through the substrate, the drum or band or through the stream of air or nitrogen or partly through the nitrogen and partly through the substrate. The asymmetric structure of the membrane is developed during the heat treatment. While still moist, the membranes are then treated with precipitating agents such as water or aliphatic alcohols containing 1 to 6 carbon atoms such as methanol, ethanol, propanol or isopropanol or mixtures of these precipitating agents at temperatures of −30° to 50° C preferably −15° to 10° C, during which time the membranes are converted from the salt state to the gel state and their asymmetric structure becomes fixed. The membranes are kept in the precipitation bath for 10 to 60 minutes. During this time, the salts of solvents still in the membranes are dissolved by the precipitation bath and, at the same time, replaced by the substance of the bath so that the membranes swell and become hydrophilic.

Preferably, the mechanical stability of the membranes is increased by a treatment with warm water at a temperature of 30° to 80° C, preferably 30° to 60° C, for 30 seconds to 10 minutes. By this thermal after-treatment, the amorphous zones partly formed in the precipitation bath during coagulation of the membrane are coverted into a state of higher order.

After they have been produced, the membranes are stored in water until required for use.

Asymmetric membranes which have been dried in air, under nitrogen or in a vacuum have only a slight permeability to water under conditions of reverse osmosis after they have been remoistened, compared with that of membranes which have been kept permanently moist. The advantageous semipermeable separating properties of the asymmetric membrane are clearly irreversibly destroyed by drying.

The completed membrane can be used in a reverse osmosis apparatus at pressures up to 300 atmospheres. A layer of filter paper is placed under the membrane on its inactive side and the membrane is placed on a porous metal plate and clamped into position. The salt solution is pumped past the active membrane surface by a pump circulation process. The desalinated water passing through the membrane is discharged through a tap at the side and the salt content is determined by titration.

The hollow fibre membranes are used in a permeator described in U.S. Pat. No. 3,339,341.

The membranes according to the invention have good desalinating properties for sea water at high throughflow rates, for example for a 3.5% sodium chloride solution at 130 atmospheres the membranes attain throughflow rates of 50 to 200 l/m² d with a salt retention of 94 to 99.9% sodium chloride.

It should be particularly noted that the membranes according to the invention have excellent resistance to hydrolysis, for example, they undergo no change in their semipermeable membrane properties over a wide pH range of from 0 to 9. This makes it possible for them to be widely used for the purification of effluent water and separation of mixtures of substances.

The membranes according to the invention are very thermostable and have excellent mechanical stability. For example, they do not undergo any noticeable change in their membrane properties under prolonged exposure to pressures of up to 300 atmospheres.

The membranes according to the invention are therefore advantageously used for the desalination of sea water, brackish water and effluent water, for the substance separation of solutions and for concentrating fruit juices and whey on the principle of reverse osmosis and ultrafiltration, particularly in a strongly acid medium at pH values of 0 to 4 and at elevated temperatures.

The membranes described in the following Examples were tested in a reverse osmosis apparatus of V4A steel at 130 atmospheres. The membrane was undercoated with filter paper placed with its inactive side on a porous metal filter and clamped into the apparatus. A 3.5% sodium chloride was continuously pumped past the active side of the membrane at a rate of 15 l/h. The total area of the membrane effective for desalination was 44 cm². The desalinated water passing through the membrane was discharged through a tap at the side and its sodium chloride content determined by titration.

After the test run, the membrane was examined for faults. For this purpose, it was placed on a filter paper and clamped into a suction filter in which it was covered with a 5% aqueous fuchsine solution. The coloured solution was then sucked through the membrane. If the filter paper underneath the membrane was still colourless after 30 minutes this was an indication that the membrane was free from faults.

The values indicated in the Examples were obtained with membranes which had been tested for at least 24 hours under the given conditions in the reverse osmosis apparatus.

EXAMPLE 1

10 g of a co-polybenz-1,3-oxazine dione-(2,4) consisting of 80 mols percent of units of the general formula (A)

(A)

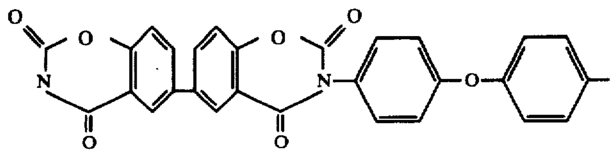

and 20 mols percent of units of the general formula (B)

(B)

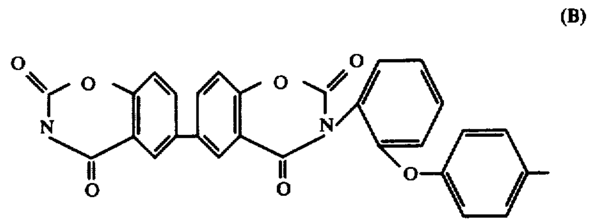

were dissolved in 88 g of N-methylpyrrolidone, and 2 g of lithium chloride were added. The clear solution was filtered through a suction filter and left to stand until it was free from bubbles. Part of this solution was used to draw a film 300 μ in thickness on a glass plate, using a mechanical film carriage, and the film was then dried on a hot plate at 80° C for 20 minutes in a vigorous stream of nitrogen. After 10 minutes' cooling at room temperature, the film on the glass plate was dipped in an ice bath and kept there for 30 minutes. The moist film was then tested in the reverse osmosis apparatus. The flow through the membrane was found to be 195 l/m² d of a 3.5% sodium chloride solution adjusted to pH = 1 with hydrochloric acid when the operating pressure was 130 atmospheres and desalination was 99.3%.

EXAMPLE 2

15 g of a polybenz-1,3-oxazine dione-(2,4) consisting of structural units (C)

(C)

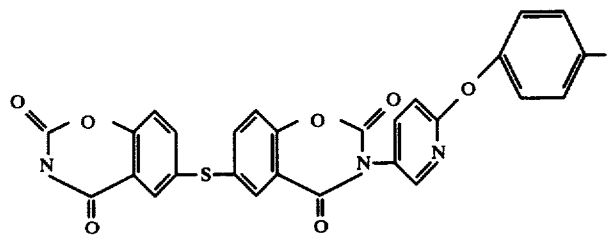

were dissolved in 82 g of N-methylpyrrolidone, and 3 g of lithium chloride were added. The clear solution was used to draw a film 300 μ in thickness in the same way as in Example 1 and the film was heated to 80° C for 20 minutes. The flow through the membrane was 60 l/m² d of a 3.5% sodium chloride solution adjusted to pH = 0 with sulphuric acid and desalination was 97% at an operating pressure of 130 atmospheres.

EXAMPLE 3

15 g of a polybenz-1,3-oxazine dione-(2,4) consisting of the structural units (D)

(D)

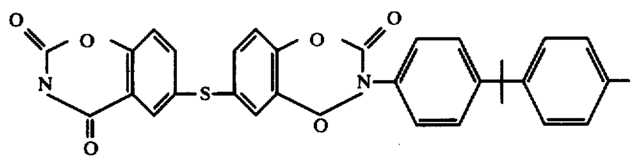

were dissolved in 82 g of N-methylpyrrolidone, and 3 g of lithium chloride were added. A film 300 μ in thickness was drawn from the clear solution as in Example 1 and treated at 70° C for 20 minutes. The flow through the membrane was 60 l/m² d for a 3.5% sodium chloride solution adjusted to pH = 1 with hydrochloric acid and desalination was 97.5% at an operating pressure of 130 atmospheres.

EXAMPLE 4

15 g of a polybenz-1,3-oxazine dione-(2,4) consisting of the structural units (E)

(E)

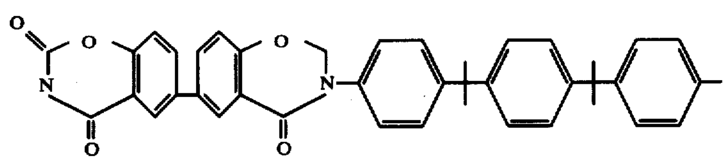

were dissolved in 82 g of N-methylpyrrolidone, and 3 g of lithium chloride were added. A film 300 μ in thickness was drawn from the clear solution as in Example 1 and treated at 70° C for 20 minutes. The flow through the membrane was 24 l/m² d of a 3.5% NaCl solution adjusted to pH = 3 with hydrochloric acid and desalting was 96.5% of sodium chloride at an operating pressure of 130 atmospheres.

EXAMPLE 5

15 g of a polybenz-1,3-oxazine dione-(2,4) consisting of the structural units (F)

(F)

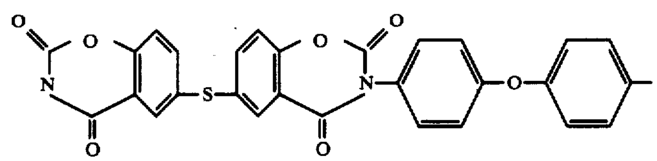

were dissolved in 82 g of N-methylpyrrolidone, and 3 g of lithium chloride were added. A film 300 μ in thickness was drawn from the clear solution as in Example 1 and treated at 60° C for 20 minutes. The flow through the membrane was 123 l/m² d for a 3.5% sodium chloride solution adjusted to pH = 1 with sulphuric acid and desalting was 94.5% of sodium chloride at an operating pressure of 130 atmospheres.

EXAMPLE 6

8 g of a polybenz-1,3-oxazine dione-(2,4) consisting of the structural units (G)

(G)

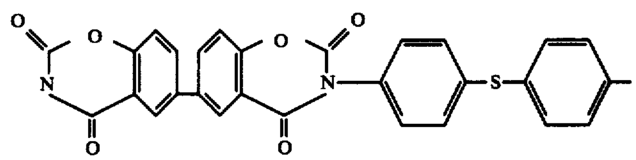

were dissolved in 90 g of N-methylpyrrolidone, and 2 g of lithium chloride were added. A film 300 μ in thickness was drawn from the clear solution as in Example 1 and treated at 120° for 30 minutes. The flow through the membrane was 51 l/m² d of a 3.5% sodium chloride solution adjusted to pH = 1 with hydrochloric acid and desalination was 95.7% of sodium chloride at an operating pressure of 130 atmospheres.

EXAMPLE 7

11 g of a polybenz-1,3-oxazine dione-(2,4) consisting of the structural units (H)

(H)

-continued

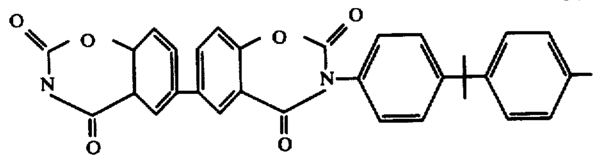

were dissolved in 87 g of N-methylpyrrolidone, and 2 g of lithium chloride were added. A film 300 μ in thickness was drawn from the clear solution as in Example 1 and treated at 120° C for 30 minutes. The flow through the membrane was 60 $l/m^2 d$ of a 3.5% sodium chloride solution adjusted to pH = 3 with sulphuric acid and desalination was 96.9% of sodium chloride at an operating pressure of 130 atmospheres.

EXAMPLE 8

10 g of a copolybenz-1,3-oxazine dione-(2,4) consisting of 50 mols percent of units (D) of the general formula (D)

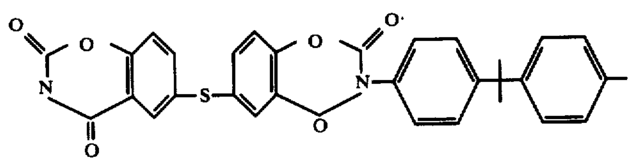

and 50 mols percent of units (H) of the general formula (H)

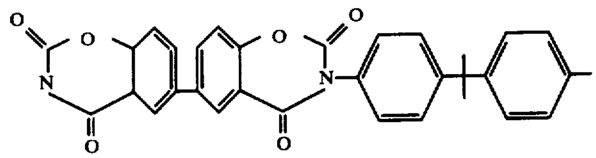

were dissolved in 88 g of N-methylpyrrolidone, and 2 g of lithium chloride were added. A film 300 μ in thickness was drawn from the clear solution as in Example 1 and treated at 100° C for 20 minutes. The flow through the membrane was 48 $l/m^2 d$ of a 3.5% sodium chloride solution adjusted to pH = 1 with hydrochloric acid and desalination was 97.2% sodium chloride at an operating pressure of 130 atmospheres.

EXAMPLE 9

15 g of a copolybenz-1,3-oxazine dione-(2,4) consisting of 50 mols percent of units (F) of the general formula (F)

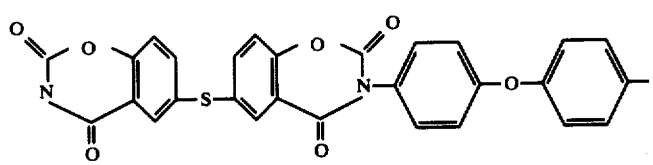

and 50 mols percent of units (D) of the general formula (D)

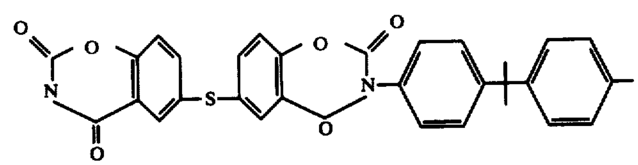

were dissolved in 82 g of N-methylpyrrolidone, and 3 g of l/m lithium chloride were added. A film 300 μ in thickness was drawn from the clear solution as in Example 1 and treated at 100°C for 20 minutes. The flow through the membrane was 27 $l/m^2 d$ of a 3.5% sodium chloride solution adjusted to pH = 1 with sulphuric acid and desalination was 95.4% of sodium chloride at an operating pressure of 130 atmospheres.

EXAMPLE 10

15 g of a copolybenz-1,3-oxazine dione-(2,4) consisting of 25 mols percent of units (A) of the general formula

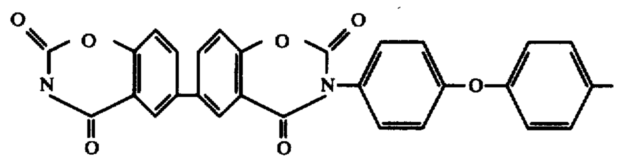

(A)

and 25 mols percent of units (H) of the general formula

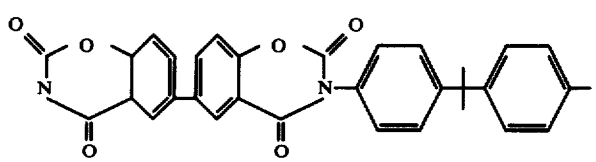

(H)

and 25 mols percent of units (F) of the general formula

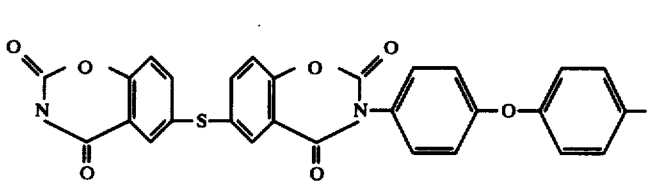

(F)

and 25 mols percent of units (D) of the general formula

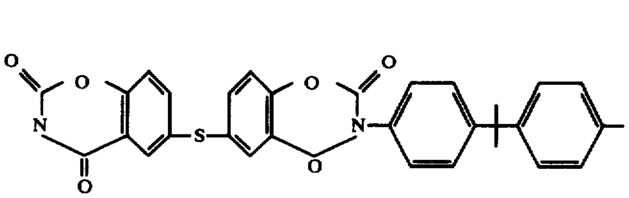

(D)

were dissolved in 82 g of N-methylpyrrolidone, and 3 g of lithium chloride were added. A film 300 μ in thickness was drawn from the clear solution as in Example 1 and treated at 90° C for 20 minutes. The flow through the membrane was 69 $l/m^2$ d of a 3.5 percent sodium chloride solution adjusted to pH = 1 with hydrochloric acid and desalination was 99% of the sodium chloride at an operating pressure of 130 atmospheres.

EXAMPLE 11

10 g of a copolybenz-1,3-oxazine dione-(2,4) consisting of 50 mols percent of units (A) of the general formula (A)

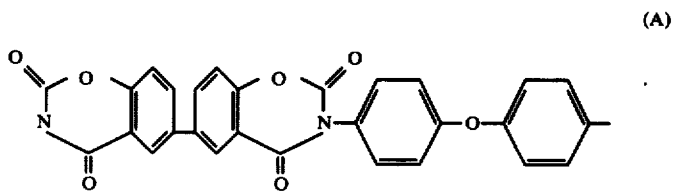

and 50 mols percent of units (F) of the general formula (F)

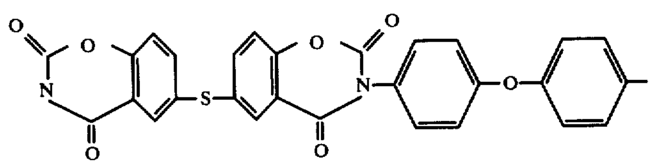

were dissolved in 88 g of N-methylpyrrolidone; 2 g of lithium chloride were added. A 300 μ film was drawn from the clear solution as in Example 1 and treated at 120° C for 20 minutes. The flow through the membrane was 54 l/m² d of a 3.5% sodium chloride solution adjusted to pH = 1 with hydrochloric acid and desalination was 98.8% of sodium chloride at an operating pressure of 130 atmospheres.

We claim:

1. In the method of desalination of sea water by reverse osmosis employing a membrane, the improvement wherein said membrane is an asymmetric semipermeable membrane of a homoor copoly-benz-1,3-oxazine dione-(2,4).

2. The process of claim 1 wherein said membrane includes a structural moiety of the formula (I)

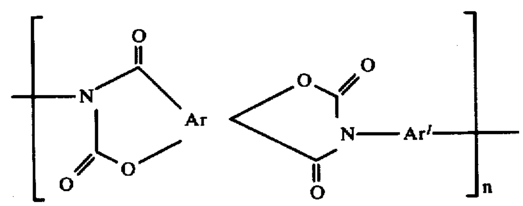

wherein Ar is a tetravalent aromatic group having 6 to 12 carbon atoms, the two bonds which bond the oxygen function and the carbonyl function are in ortho-position to each other, n is 10 to 200 and $Ar^{I}$ is an aromatic phenylene or naphthylene group or a group of the formula $$—Ar^{V}—Y—Ar^{VI}—$$

wherein $Ar^{V}$ and $Ar^{VI}$, which may be the same or different, are aromatic groups having 6 to 12 carbon atoms and Y is a bridge member of the formula

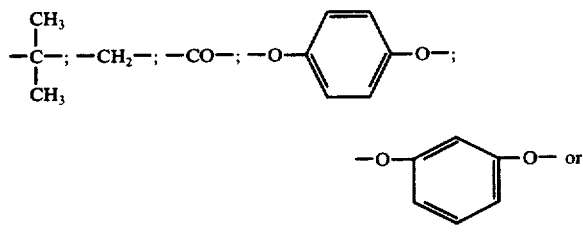

3. The process of claim 2 wherein Ar is of the formula

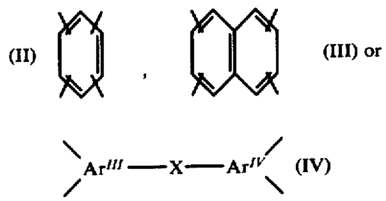

wherein $Ar^{III}$ and $Ar^{IV}$ are each an aromatic group with 6 to 12 carbon atoms and X is a covalent bond or a bridge member of the formula —O—, —S—, $—SO_2—$, $—CH_2—$, $$\begin{matrix} CH_3 \\ | \\ —CH— \end{matrix}$$

or —CO—.

4. A method for separating or concentrating mixtures of substances by reverse osmosis employing a membrane wherein said membrane is an asymmetric semipermeable membrane of a homoor copoly-benz-1,3-oxazine dione-(2,4).

5. The process of claim 4 wherein said membrane includes a structural moiety of the formula (I)

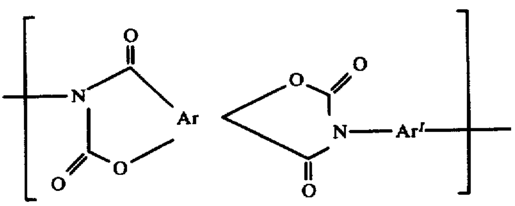

wherein Ar is a tetravalent aromatic group having 6 to 12 carbon atoms, the two bonds which bond the oxygen function and the carbonyl function are in ortho-position to each other, *n* is 10 to 200 and $Ar^{I}$ is an aromatic phenylene or naphthylene group or a group of the formula $$—Ar^{V}—Y—Ar^{VI}—$$

wherein $Ar^{V}$ and $Ar^{VI}$, which may be the same or different, are aromatic groups having 6 to 12 carbon atoms and Y is a bridge member of the formula

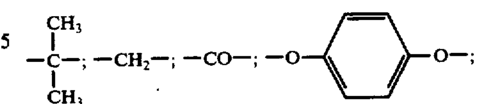

-continued
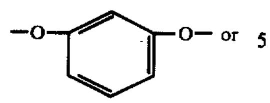
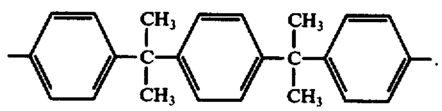
6. The process of claim 4 wherein Ar is of the formula
-continued
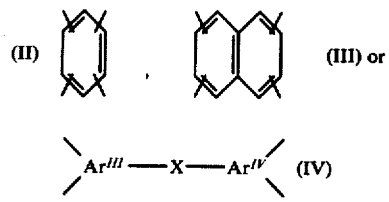
$\rangle Ar^{III}—X—Ar^{IV}\langle$ (IV)
wherein $Ar^{III}$ and $Ar^{IV}$ are each an aromatic group with 6 to 12 carbon atoms and X is a covalent bond or a bridge member of the formula —O—, —S—, $—SO_2—$, $—CH_2—$,
$$-\underset{}{\overset{CH_3}{\overset{|}{C}H}}-$$
or —CO—,
* * * * *